United States Patent [19]
Jones

[11] Patent Number: 6,142,623
[45] Date of Patent: Nov. 7, 2000

[54] COUNTERPOISED CRANIAL SUPPORT FOR EYEWEAR

[76] Inventor: Kenneth E. Jones, 946 N. Congress St., Apt. #2, Jackson, Miss. 39202-2541

[21] Appl. No.: 09/193,158

[22] Filed: Nov. 17, 1998

[51] Int. Cl.$^7$ .................................................... G02C 3/00
[52] U.S. Cl. ........................... 351/156; 351/155; 351/158
[58] Field of Search .................................. 351/156, 155, 351/158

[56] References Cited

U.S. PATENT DOCUMENTS

| | | | |
|---|---|---|---|
| 104,216 | 6/1870 | Sickels | 351/156 |
| 654,346 | 7/1900 | Graham | 351/156 |
| 758,629 | 5/1904 | Eason | 351/156 |
| 1,238,496 | 8/1917 | Comer | 351/156 |
| 1,660,896 | 2/1928 | Tallman | 351/156 |
| 3,365,263 | 1/1968 | Allen | 351/55 |
| 3,955,885 | 5/1976 | Aronsohn | 351/155 |
| 4,131,341 | 12/1978 | Bradley, Jr. | 351/136 |
| 4,152,051 | 5/1979 | Van Tiem | 351/59 |
| 4,616,367 | 10/1986 | Jean, Jr. | 2/452 |
| 4,852,189 | 8/1989 | Duggan | 2/452 |
| 4,986,649 | 1/1991 | Smith | 351/130 |
| 5,506,638 | 4/1996 | Donner | 351/155 |

FOREIGN PATENT DOCUMENTS

| | | | |
|---|---|---|---|
| 1158457 | 7/1969 | United Kingdom | 351/156 |

*Primary Examiner*—Huy Mai

[57] ABSTRACT

This highly balanced, nose-independent type of eyewear device keeps optical devices securely positioned before the eyes in previously unobtained, carefree comfort. It also allows micro-positioning of optical devices at definite placements. Select device of the method likewise stows glasses, handy on, both above and below line-of-sight. The head, including ears is used extensively, but not the nose or other face, except and unless by the margins. Typically tensile strap (70) or one or more rigid cranial-crown extensions (72) [dubbed pate-pieces] extend to the top of the head from somewhere along distally counterweighted, glasses earpieces. Alternately a counterweight-and-support line (34) is strung from a [whimsically chosen] counterbalancing mass (32) behind the head to support the front. Counterpoised cranial support inherently lends more latitude to eyewear design. This type of support promises to spawn an explosion of pleasing, exciting new eyewear. The disclosure espouses glasses which absolutely stay put, while remaining comfortably unnoticed.

9 Claims, 3 Drawing Sheets

COUNTERPOISED CRANIAL SUPPORT FOR EYEWEAR

BACKGROUND

1. Field of the Invention

Device of this method is to relieve some to all weight of eyewear from the usual pressure points about the ears and nose, especially the nose.

2. Description of the Prior Art

By being located between the eyes, the nose historically was early in the short-line of obvious places to lodge spectacles. Together with the ears, the nose soon established a triad of stably spaced points that furnished a ready platform for standardized glasses framing of a design which to this day provides mounting for aids-to-vision. On that account though, the all-too-conveniently located nose has also just as long been the primary locus of much of the pain that we associate with glasses.

Delimitation of terms In this disclosure and claims optical device does not include contact lenses, but does include other externally worn devices which characteristically intercept light before it passes into an eye, including: refractive lenses; refractive and non-refractive, transparent light-filters, both polarizing and tinted; spectacles or eyeglasses, both prescribed and over-the-counter; reading glasses and magnifiers; shades or sunglasses and fashion eyewear; and safety glasses or eyeshields—all being devices of the common heritage of popularly available ocular devices normally head-worn by the larger public. "Eyewear" encompasses the above inclusive list. However Optical device is not herein meant to include head-worn, electronic-display-imaging device which is only for viewing head-worn display of electronically processed or converted images. "Head" includes the ears and "face" includes the nose.

State-of-the-art holders of optical devices have not progressed so that they can generally be used with comfort, especially after an appreciable period of continued use. The worrisome bother, attending the nosepiece points to the weakest link in contemporary eyewear designs. The simple, ultimate reply is to completely unburden the nose.

Reminding of deep, distressed-looking indentations between the eyes, especially of oldsters, reality vaguely whispers that we might try to look past our noses, if we intend to see past them for a better way to use optical device. Discomfort is first among long-recognized disadvantages intrinsically tied to the nosepiece. Another drawback, directly linked to continued misuse and abuse of the genuinely inadequate nose, is a lack of a positive-retention capability. Device presented here solves both problems by discounting the nose as a viable basis for supporting. This counterpoised cranial-support method entails other benefits which are extensively, if not exhaustively, number-itemized under "Objects and Advantages." Among them is static and stable, very wide-ranging, vertical positionability.

Historically, according to the state of accepted art, eyewear embodied tradeoffs between retainability and comfort. Eyewear design also required juggling mutually co-exclusive interrelationships between comfort and positionability and between comfort and cost. But no similar compromise is necessary when employing concepts of counterpoised cranial-suspension into new eyewear. As a result, huge improvements in all four mentioned capabilities are at once easy. This method presents an exciting contrast of new and extended boundaries to be explored—with comfort, the most important and fundamental consideration of all, being enhanced the most, because the easily disquieted nose can be completely unburdened from being an overlooked, impossible to ignore, raw source of sore concern.

Whereas longstanding attachment to the nose has precluded even timorous attempts to break free of it, two other areas of the face, and the nose as well, have been field for effort, but yielded only marginally improved nosepieces or otherwise thoroughly disappointing, generally adjunctive siblings to the nosepiece but adapted to other parts of the face, either above or below the eyes—thus introducing what could be called cheekbonepieces and the browpiece. But being akin to nosepieces, both have their set of kindred deficiencies. We were on the right track—the path that lead away from nasal means—but halted too close into the journey to see of the first signs that read of cranial-suspension generally and therefore of balanced and dynamically balanced suspension. Just the same, when using glasses for longer periods, (as when on a trip facing toward the sun) good embodiments of either type of above-mentioned invention which rely less on the nose would certainly be a boon toward maintaining a placid equilibrium of inner tranquillity and good humor. If some rendition of my invention were available though, both of those types of device would be as unnecessary as nose-pads on the glasses would be altogether superfluous and primarily just in the way.

Nose-sized, nose-cushions might be the only fix still left untried for facial-support. But before we resort to such extremes, we might adopt this comprehensive, very workable answer to the host of facepiece-related problems and begin to rest our eyewear further back on our heads—if we are willing to use them.

Secure, comfortable, and worry-free eyewear support can be accomplished by connecting to the bridge of a glasses with a string strung across the top of the head to a mass which weighs about the same as the glasses in front and which hangs behind the head. That deceptively simple example is just one device which employs dynamically counterpoised cranial-suspension, but it also illuminates basic theory behind other embodiments of this innovative concept—besides being a practical and easy alternative to miserably disturbing glasses maddeningly gripping the nose, or sometimes worse, eyewear left haphazardly and precariously perched upon the nose, and not seizing the nose, but slip-sliding down again and again.

Having been honed by centuries of incremental development, popular eyewear is still handicapping when limited for use by itself. If the familiar, tried-and-staid, readily available glasses is conjoined with device of this disclosure, it is liberated from essentially depending on the nose for an unhappily qualified support. The far-sighted inventor applies such strictly conservative philosophy of primary functionality toward personal optical implement to find indispensable a popped-out lens from cheap reading glasses (a version of the ancient ocular) and carries one always, even in the the key-pocket of swim wear.

In a demonstration trick, a volunteer who agrees not to use hands, can be pinned to a surface and rendered completely helpless by a sewing thread stretched across the bridge of the nose. Even with the the best of nosepieces, since the nose is so tender, pressure which is perceivable but perhaps untaxing at first, can get stressful to the point of impairment after a prolonged period of necessity with eyeglasses. Furthermore the steep, slanted sides of the average nose causes the real force on the flesh to be much more than the weight supported. Actual, pertinent multiplying factor is the cosecant of incline from vertical of the facial surface upholding eyewear: between two and three, typically (times weight.)

The most ideally fitted apparatus descends the the sloping nose ridge, on its own, partially because of the slipperiness of the nose, which is liberally lubricated with skin oils and perspiration accumulation under the pressure-cooker conditions beneath nose pads, even in cooler environments. With rapid head motion such as on jostling transportation, some glasses fall. To the knowledge of the inventor, any previous attempt toward securing against such dynamic disturbance introduced at the same stroke another source of eventual discomfort. But cranially-suspended, balanced eyewear absolutely braces against gravity, independent of the nose. And being freed of imbalance, it stays comfortably put. Its natural properties deal with up-and-down movement as they handle gravity. Friction, either already present or arranged, might be useful however, to dampen an angular-inertial characteristic about an ear-to-ear axis of some of the bascule device within this (head-borne, highly balanced) genre of devices, in order to allay its rocking tendency during quick nodding-motions.

Much prior art that was intended to remedy conventional eyewear, typically merely mitigates it or just postpones the insideous anguish which, after a matter of minutes, begins to emanate from the nose. But that anguish is mostly due to a buildup of suppressed reaction, a distracting culmination of nervous responses to the burr-under-the-saddle nasal sensations that dominate during bouts with eyewear.

The dim inescapable prospect of prolonged glasses-use, tragically often nearly debilitates. Precious mental energy is lost controlling subconscious agitation which spreads anyway, throughout the nervous system of the glasses-distressed, not to mention unhappily affected, fellow pilgrims who though personally innocent of bothersome glasses, yet labor only once removed from such glasses-users, who while they deny their own suffering, might remain largely oblivious concerning the interconnectedness of the entire communal network, so that they try the patience of those who are otherwise personally eroded by still others who were also crossed, perhaps directly, perhaps as well, through several other souls, variously removed.

Nosepiece-improvement device generally increases the load bearing area on the nose, includes other face, or provides better formed or conforming nosepieces. But due to deficiencies of using the face to support, the resulting glasses also offer the same-old, inherent limitations. The wearer is therefore, destined to experience a milder or delayed, but eventually incessant and merciless, constant searing of nosepiece-pestered skin; and being visited by that extra travail, know reduced personal reserves—all after the certain onset of acute, highly localized, dermotropic trauma. Incidental to a highly conforming or form-fitted nosepiece, the same patch of skin sees uninterrupted strain, without even the momentary respite for repair afforded by less complicated and costly glasses which do not remain in place so well.

As early as 1870, U.S. Pat. No. 104,216 to Sickels described a static cranial-suspension that was totally independent of the nose. However head-borne, gravitationally balanced and dynamically counterpoised device of this present method delivers stark advantages over all device that hangs static. Being statically balanced or weight-compensated lets much of my device have definite vertical positionability. Handy, on-face, out-of-line-of-sight stowage is possible much more extensively than with any of the following static-suspension gear, some of which do not provide in-use stowage at all, and however nasally liberating they all are, they are also inflexibly tied to encumberingly unwieldy, fixed suspension: Eason's U.S. Pat. No. 758,629 (1904) and U.S. Pat. No. 1,238,496 (1917) to Comer (both these devices support very similarly across the cranial crown, but lacking weight compensation, both also depend on a head-gripping method to unburden the nose); U.S. Pat. No. 1,660,896 (1926) to Tallman and Tanksley; U.S. Pat. No. 4,152,051 (1979) to Van Teim et al.; U.S. Pat. No. 4,616,367 (1986) to Jean, Jr. et al.; U.S. Pat. No. 4,852,189 (1989) to Duggan.

Devices according to Die Casting of England's Pat. No. GB 1,158,457 (1969) depend on weights for support. But with their scheme, since the weights create an asymmetry by not being similarly offset, there is backward pull on the front, instead of upward, causing device of their method to press the glasses to the face with a pull which is equal to the combined weight that dangles behind the ears; while glasses weight also bears downward with the same force on the face that would prevail alone if unweighted, regularly rigid ear-extensions were used.

Endeavors specifically to solve the bridge of the nose conundrum are: U.S. Pat. No. 3,515,467 (1968); U.S. Pat. No. 3,955,885 (1976) to Aronson; U.S. Pat. No. 4,131,341 (1978); U.S. Pat. No. 4,986,649 (1991) to Smith; and U.S. Pat. No. 5,506,638 (1996) to Donner. Such nosepiece art typically mentions the word "comfort," even when comfort was not the primary goal. But Hurst specifically attempts to alleviate discomfort by using self-adjusting nose pads in conjunction with a brow rest: U.S. Pat. No. 2,547,467 (1951). O'neil in U.S. Pat. No. 4,190,334 (1980) stated objectives of comfort, low-cost, simplicity and adjustable, non-slip, positionability. All their techniques combined would fail to furnish any one of those six mentioned benefits as well as this method accomplishes each and all of them, because while those efforts were elementally entangled with trying to find a viable footing on the face, the eyewear-support method presented here is both better balanced and it altogether shunts past uncomfortable and unsure facial support, in favor of solid, sound and certain, head-based support.

The holder of U.S. Pat. No. 4,252,422 probably gets the best stability possible, (from nosepiece support means) via custom-molding and with a professional-adjustment-and-fitting process. In U.S. Pat. No. 4,834,524 (1989) Borsos, notes inadequacies of resilient contact pads, but nevertheless, tries to achieve non-slip comfort through on-nose, pliably compliant strips. Marly in U.S. Pat. No. 4,304,470 (1981) realistically only seems to aspire to delay the onset of nose discoloration, which is described in U.S. Pat. No. 4,787,729 (1988, to Ruffen) as superficial, temporary skin damage [the implied capacity of his device to redistribute weight to the ears is directly disputed here, however.] Both then undertake to reinvent nasal support. At least their single, saddle-type devices remove from the nose, the vicious, pinch-biting effect of nose pads in pairs, while at the same time however, lowering the glasses' ability of to stay in place. But nasal support means should finally be discredited, and hopefully totally disregarded hereafter as a sole, primary, or even secondary means for holding glasses. This emphatically more cerebral method obviates the necessity to stick all sorts of visual stuff upon the nose. Therefore it is a veritable panacea for the worst of problems attached to glasses.

Rather than reaching absolutely outmoded obsolescence, nosepieces might be incorporated for convenience of short-period usage and redundancy. Even some of the most complex, self-adjusting examples of nosepiece-craft have, by ingenuity of manufacture, acquired an off-the-shelf substitute to simplicity. Their mutability suggests that they will be as adaptive to demands of the future as developments warrant.

In U.S. Pat. No. 3,365,263 (1968) Allen provides limited, in-line-of-sight, positive repositionability, as long as the nosepiece stays put—a decidedly problematic proposition with nosepieces in general. By contrast, certain simple counterpoised cranial-suspension device positively and comprehensively accomplishes effortless, infinitely variable, positive vertical-positionability, from below line-of-sight to above.

Among other problems directly addressed in the prior art, as associated with using the only device generally available then to hold up glasses, are medically significant conditions of the ear or nose support areas. Thus far though, nothing nearly so successfully, so comprehensively solves, all at once, so many of the nuisances usually associated with eyewear as counterpoised cranial suspension does, while removing a myriad of minuses and inconveniences that all tie directly to conventional eyewear.

Perhaps it is amplifying to note two conditions under which the method tends to fail: in strong blasts of air from generally rearward and with upside-down gravity.

Going all the way back, for comforting reassurance of precedent, history reveals a progression of improvement in the means of holding instruments that intercept light before it enters an eye. Progress happened by increasingly adapting the apparatus to the user, beginning with a single, finger-held, ground and polished, glass lens becoming the monocle, by migrating from the hand to the musculature of the ocular orbit. Later a pair of appropriately spaced lenses became, in the hand, the lorgnette, and on the nose, pincers which in turn, in a breakthrough for increased stability and retention, acquired ear extensions. That is where a pre-modern, stagnant configuration essentially froze into a notoriously successful contrivance of remakably limited design. Perhaps from being accustomed to them, such spectacles still seem to still seem to look smart, even to the post-modern eye. Contacts were a giant leap in some respects, not in others.

We have toiled under and tussled with trying to tolerate antiquated eyewear long enough that another step of improvement now appears in the order of the march. To hope to know that the next generation of spectacles support has arrived is to help awaken to the merits of this invention.

OBJECTS AND ADVANTAGES

Draping optical device over the head like a pair of saddlebags is much more stable than glasses sitting high on the nose, bareback, with ear-pieces run right past the stirrups. This humble inventor declares that the disclosed, counterpoised cranial-suspension device appears far superior to the sum aggregate of patents cited, though each in its own way and in some essence addresses the burning issue of noses everywhere ridden raw by eyewear. Transferring the weight of eyewear to generally higher, larger, and most importantly, less-sensitive areas of the head solves a rash of problems that has always plagued eyewear which perched on the nose.

All the device presented here furnishes full static balance, while some furnishes fully dynamic, weight-compensated support as well. The method should greatly extend the age-old design, which has had glaring deficiencies—most stemming from the weakness of relying on the singularly unsuited and unsuitable nose as basis for its most critical means of support. Upper-cranial suspension furnishes at once, wholly enhanced comfort, incredibly refined stability, greatly improved retention, and also two new benefits of absolute and positive positionability, from an emerging plethora of proposed optical-device-related products; all while maintaining essentially intact, the set of familiar capabilities which we, being accustomed to them, already expect from glasses. Depending on the momentary wishes of the user, this systematic solution, either augments and compliments or completely obviates the ubiquitous nosepiece as an active support member. Users of this device will enjoy genuinely secured glasses in comfort.

Supplanting nasal support with cephalic-based suspension, simply leaves discomfort as a critical non-factor for consideration during glasses design. The crown of the head can easily carry even heavy loads, for very long whiles—as pictures of burdening on heads of gentle women from north of the Mediterranean to below equatorial Africa bears witness.

And friction-aided, dynamically suspended apparatus wants to stay up or down as it is stationed, since would-be perturbing forces tend to occur in self-canceling pairs. Otherwise, purposefully rapid or pronounced nodding-motion could intentionally and hands-free reposition certain bascule device. With cranial suspension which is based on a formula of counterbalanced weight plus useful friction, other than a gain of acceptable extension to optical device—extending a process of improvement begun in the age of Gallileo—there need be no loss of feature or function or compromise of capability of glasses frames, as compared to before or without the addition of or after disconnecting any removable cephalic suspension device. If it is deemed desirable, the the elimination of the bridge-link, and even the ear-pieces is possible.

The benefits of several ancillary functions are possible from various embodiments of this device, but many models might be designed to accomplish most if not all of the following: (1) relief of any to all of eyewear weight (the portion determined easily by quick manual-adjustment) from the bridge of the nose to parts of the head, which sense no distress, after any length of time from providing support; (2a) effortless, positive, vertical repositioning of glasses within the line of sight, such as might be helpful with multifocal lenses upon switching to a different activity; (2b) effortless, convenient and attention-free stowing of glasses, while they can be handy, on-head, both above and below line of sight; (3) absolutely secure glasses-retention, accompanied by negligible facial pressure or even no facial contact, (according to momentary discretion) so that unless glasses are inadvertently snagged or bumped, they will remain perfectly situated; (4) completely enhanced, instantaneous dynamic compensation for impulses of vertical acceleration, such as experienced jumping rope or while on a horse. [During such maneuvers, a 75 gram pair of glasses, effectively weighing anywhere from nothing to half a kilogram, would remain sublimely positioned, while the user might remain as nonchalant—toward the glasses—as if in an easy chair.] The perfectly carefree and infinitely-variable within-large-vertical-limits, stay-put stationability of some counterpoised device might just be the unsurpassable ultimate of all possible positionability solutions.

So nasal support can become a non-necessity, although as device to fall back on, while relieved of its support duties, such device could actually be a nicety. The fang-like, nosepiece projections, however, might be given as extendible, flip-away, folding, or slideable for when not directly employed and only otherwise in jeopardy of annoying the nose by inadvertent, ticklish touches—as they were required for support, nose-pads are still liable to contact the nose. Also, retracting any nosepieces, that were present would allow the glasses to go below median positions without also moving away from the eyes. But since minimal side-to-side deviation is desirable, nasal-means might still be useful, to possibly augment smaller temple clearances or extra ear security, to keep glasses against such sudden head wags as saying "no" with head language.

Other versions of the device might hinge for function on cantilever, bascule-type, rearward-extending earpieces that are distally counterweighted behind, so that it balances across the ears. But then the ears too can be unloaded by using cranial support above the ears, in the form of an earpiece-to-earpiece strap. Such eyewear will not only remain comfortably in place but tangibly so unintrusive as to be barely detectable except enough to satisfy knowing that it is actually there.

Various eyewear device might be contrived as readily personalized and embellished so that the user might be apt to test abstruse ideas or divergent thought, expose recondite interests, exhibit normally caged elements of personality, advertise personal affiliations, air opinion, espouse pet projects or personal causes, and reveal favored real escapes and fancies; while embodying varying degrees of technical complexity and sophistication, in order to best cater to the basic needs of seeing while serving to help free the spirit as well as the nose.

Key to cranial method is that the pate is capable of carrying so much more load than the nose, and with such relative ease that it seems too obvious to discuss at first, regardless of the powerful relevance of the fact to the potential of balanced cranial-support and in spite of its central significance to the method. That seeming absurdity could be partial cause for the prospects of cranial suspension not receiving previous notice for development. Also the hair no doubt, has deterred device from its somewhat exclusive domain. But upon getting aroused, this hair-mussing method has the rousing potential to spur much revolution and new parturition in the world of eyewear; the important converse is that acceptance by users will spawn additional new work in the field.

LIST OF REFERENCE NUMERALS IN DRAWINGS:

32 countermass or c-mass; weight; cwt.; massweight; mass 32A counterweight on lever-arm (length can be adjustable)

32" complementary-connected countermass or secondary counterweight

32B optical device super-holder, lower counterweight

32C distal-earpiece counterweight 34 cwt.&support line: a line of cord, thread, monofiliment or some other kind of tensile provision, for linking countermass with objectively supported device    36 adjustable keeper of massweight on cwt.&support line    38 connection provision on or for proximal end of counterpoising device    38A hook for snagging and hanging an optical-device-holder such as glasses    38B clasp for securing to an optical-device-holder such as glasses      40 rigid conduit for cwt.&support line      42 countermass and Y-yoked, cwt.&support line assembly    42A inverted "Y" linkage (for running two cwt. lines into one support line)

44 frontal type of standard

44A prefrontal standard

44B forward-extending frontal standard

48 hair fastening artifice for slideably holding cwt.&support line    48A tensile lateral-restraint for countermass    48B holder of cwt.&support line slideably    48C upright countermass tracker    48D frictional support for cwt.&support line      50 floating harness-member for finger-grasping cwt.&support line slideably    50' adjustable yoking-element for holding cwt.&support line fixedly      52 wear-impervious, highly inelastic connecting-line      54 earpiece extension for counterweight    54A ear-stop    54B earpiece extra-extension caudal-retainer    54C stabilizing upward-extension from earpiece      55 brow-piece extension    55' cheek-piece extension      56 temple-piece extension for eyepiece      58 folding-point in frames      60 strong and light, rigid framework      62 comfort-sized support-fulcrum      64 connecting-line pulley /temple-piece mount      66 springy counterpoise to weight of eyepieces      68 miniature bungee cord      70 band, belt or strapping      72 pate-piece      74 pivot for support-arm of eyepiece 2nd-counterweight (super-holder utility) and for cwt.&support line pulley of eyepiece 2nd-counterweight      76 pivot for temple-piece/eyepiece 1st-counterweight support-arm      78 optical device super-holder utility      80 top-of-head, weight-bearing device      82 back-of-head, weight-bearing device (for head bent forward)

84 lever-arm for complimentay-connected, secondary counterweight      86 lever-arm for lowest (or overall or third counterweight)

88 glamour glasses

100 simple, auxiliary cranial-support

SUMMARY

This equipoised, new, head-centric technique of supporting popular and available optical devices embraces the head and dynamically suspends glasses in a way that removes all weight from the nose. Eyewear designed according to this theme finds support anywhere on the old-bean besides the face and unashamedly surrenders that bequest of centuries of unquestioned nasal-support to the dust-heap of history. It avoids the age-old dilemma that is facial-support, by simply switching to another source of support. It trades dead-end conundrum, hopeless quandary, for a soluble proposition: counterpoised cranial method—which just happens to entail new features for eyewear. Our legacy was of long-suffering towards no real conclusion nor no good end, or at best a gross, extended, worldwide-experiment which by the scale of it is more interesting than portraiture of a bemomocled monarch, though by now it should have run its course as an accident of history and a sordid drawn-out, sadomasochistic mistake en masse by remarkably much of humankind.

THEORY OF OPERATION

In order to acceptably support optical device, a solution with no nasal basis emerges. But since the nose is so prominent, it suggests itself for ancillary involvement, however and if convenient. The rest of the face is likewise mostly discounted too since it was considered to be similarly challenged as a grounds for support. But the head is good for supporting and best above the level of the eyes. The furthest reaches happen to be most accessible for placing other weight to be supported by the glasses so that that weight can support them in return. It is beautifully elegant in practice as well as theory.

Again, that small and simple, yet very useful example of head-balanced-eyewear also serves to illuminate for the imagination how well the concept plies. Consider a nondescript article, useful only for its weight and which weighs roughly equal to the frontal weight of our eyewear. A string lies stretched across the top of the head. The string suspends the article at the back of the head and the eyewear in front.

But if we intentionally leave that version of cranial support at home, the office, in the car, or lying on the hopscotch court in favor of support which inherently compensates for rotational dynamics as well as gravity's pull and vertical accelerations, a more comprehensive, active-sports support can be contrived by locating a countermass directly above points supported. The result is glasses good for volleyball. Just getting glasses off the nose is a worthy objective. Involving the head definitely does that, and much, much more.

Any nominally small difference between the weight of eyewear to to be supported and the supporting counterweight is easily made up by naturally present, frictional forces. Otherwise stated, the difference between supporting and supported weights should not exceed available useful friction—in order for the nose to be totally freed from supporting and for the glasses to stay down in front.

For those with stout ears, and where circumstances allow for a glasses tendency to teeter-totter to be tolerated, or avoided out of habit, ear-based bascule support also relieves the nose. But when facially-limited rocking of delicately balanced eyewear would be distracting, friction is a ready fix and, fortunate for the purpose, encountered almost everywhere. Right above the ears is one good place for frictional stabilization—which works the more effectively the further up. Since on top of the head, a platform awaits to wrest support from the ears, and being that four points of support is stable where two was not, two tentacles might extend to plant on top, to make FIG. 12A device which verges on the transformer glasses of FIG. 28, mostly free of the ears as well as the nose. Cross-types begin to merge into indistinguishable hybrids as we seem to have come full circle.

DESCRIPTION AND OPERATION OF INVENTION

Figures 1, 2, 3, 4, 5, 6:
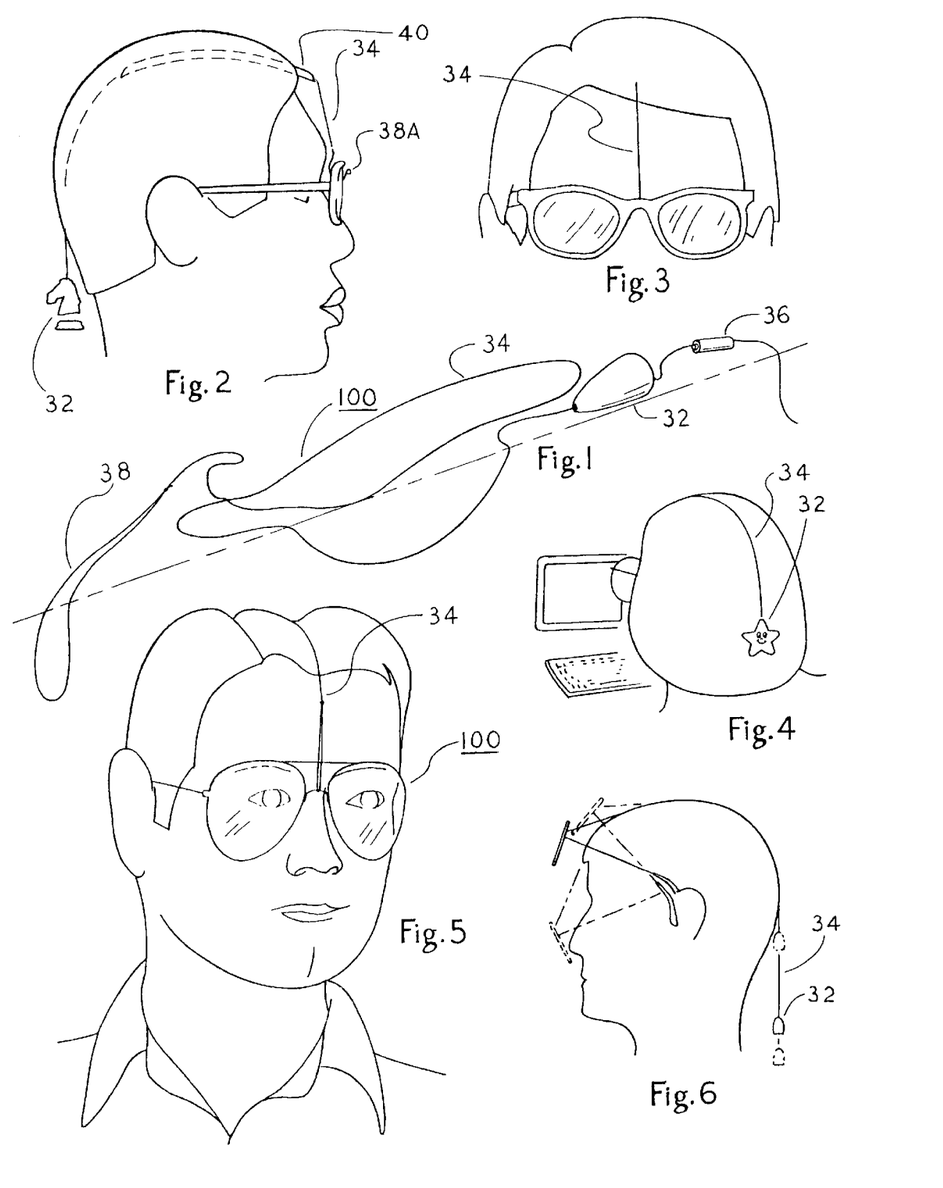
FIG. 1 renders in full-size, a still-life treatment of what might be the simplest type of auxiliary, cranial-support device possible: a fishing-weight and its frictional keeper, on a string with a loop in its other end. It is depicted draping from an edge. Please pick it up before it rolls off. Using it is easy. You will be surprised by how well it really works -since the hardest part is getting used to the idea of not needing something to rest on the nose.
FIG. 2 is a side-view of a similar device as used. But it has a hook connector and a carrier element inserted in the hair.
FIG. 3 is a front-view, also of device as in FIG. 1, but with a thread-through or other invisible glasses-connection. It is being used with the hair covering it.
FIG. 4 reveals from the rear, suspension device like that in FIG. 1 as worn entirely on top of a hair-style.
FIG. 5 shows the exact device of FIG. 1 laid over the hair.
FIG. 6 profiles the same device of FIG. 1 in use to show the range of vertical positioning with such device. With sufficient weighting, a wearer could use binoculars the same way, comfortably for as long as needed.

In FIG. 1 a mass, massweight or countermass 32 is held on a string cwt.&support line 34 by a frictional keeper 36 (in place of a readily available but less easily adjustable, large knot.) Auxiliary pendulous support device 100 is shown with a fishing weight for a generalized example of countermass 32 (of weight to offset the frontal weight of any eyewear to be lifted from the nose and held there not touching it). A typical countermass could be attractive or telling in some aspect, if only by causing notice to some commonly ignored, discardable item, such as the handle from a broken cup. On the opposite end of the line 34 is a small loop, proximal connection provision 38. The loop ties to the bridge of glasses. When attached to glasses in place, this perfectly simple and practical, auxiliary support device 100 contributes to statically (and somewhat dynamically) counterpoised eyewear. Variations of the device are shown used in situ, in FIGS. 2 thru 6.

FIG. 2 reveals a conduit 40 worn in place close to the scalp containing the cwt.&support line 34. With the glasses, and possibly the (interest broadcasting) counterweight 32 removed, the line can remain in the hair. If the line comprises small bungee cord from FIG. 21, it could recoil to inside the conduit. An upright portion of the conduit could house a countermass. Extended forward in front, conduit 40 (either open-channel or tubular) determines the angle of upward pull to suit the user and match the glasses and conditions of use, while holding the line entirely away from the forehead. If desired, an open-hook provision 38A as shown, facilitates quick retrieval and reattachment of the line.

FIG. 3 shows a device 100 from FIG. 1 worn visibly un-intrusive and almost undetectable under hair, with an indiscernible cwt.&support line 34 of such as small clear, monofilament nylon which is available, held from creasing the skin of the forehead.

FIG. 4 suggests a style of wearing the simple pendulous device 100 of FIG. 1 with hairdos (such as bangs), which aesthetically accommodates the auxiliary-support accessory by subduing its visual impact.

In FIG. 5 a practical-minded fellow sports the exact device of FIG. 1 which he pulled from a handy pocket, and which (inevitably helped by string-to-hair friction) combines with the glasses frames to dynamically support the lens.

FIG. 6 illustrates the extended range of positioning that is readily available and easily manipulated with the simple, pendulous device 100.

If countermass 32 is of well-chosen weight for the forward-and-back angle of the line in front (generally vertical), even jumping up and landing hard will not vertically shift the glasses. But if the glasses jig upward, the c-mass is relatively too heavy. And if they displace to lower with each impact, it might be decided that added weight is called for (or a larger or denser mass selected.) To precisely determine the weight: weigh the front of the glasses with the earpieces resting off of the scales and match the counterweighting to the reading.

If it is generally within notion to have cwt.&support line 34 be noticeable, flat, ribboniform or soft, thick line might comprise any part that contacts the forehead, since a vertical mark often forms under the line and lingers for minutes. But it is a matter of appearance only and reflects no real discomfort. Sticking a smallish, soft, possibly semi-globular stand-off on the line also solves the problem spectacularly. If glasses that have flip-away, slide-aside, or no nosepiece pads at all are part of device of this method, the proclivity toward slight, nose-bothering aggravation, will be eliminated from such nose-bridge device that is meant to hug the nose tightly, but still hovers above the nose while using cranial suspension.

Figures 7, 8, 9:
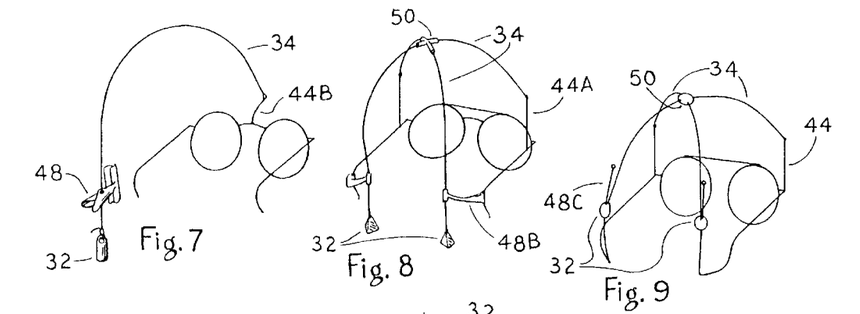
FIG. 7 schematically illustrates an auxiliary cranial support device 100 being used, but with the string of the weighty-mass slideably fastened against excessive swings by means of a generic hair-clip, and connected to the glasses via a forward-extending standard in front.
FIG. 8 shows use of two FIG. 1 devices, both with half-sized massweights connected to prefrontal standards.
FIG. 9 depicts device similar to that in FIG. 8, with frontal standards.

FIG. 7. Production device per FIG. 7 would probably have a more imaginative hair fastening artifice 48 to prevent cwt.&support line 34 from allowing the massweight 32 excursions from behind the head following a reverse couple of wide swings of the head or when the head is leaned sideways. The forward extension of forward-leaning frontal standard 44B is probably exaggerated as shown, since without correspondingly complementary overhang past the top of the forehead, from such as conduit 40 of FIG. 2, the cwt.&support line 34 would pull excessively rearward on the face with the glasses as it held them up.

FIG. 8 shows another dynamically compensated suspension system with a left ½ (of the total counterweighting) mass 32 upholding the right front corner of the glasses and a right half-mass 32 supporting the left front corner of the glasses through cwt.&support lines 34 that therefore cross at the top, thereby also slideably positioning a harness-fitting member 50 at the apex. In order to cause each line 34 to tend to traverse the cranial crown along a stable trek that also includes the apex, either holder of cwt.&support line slideably 48B and its corresponding prefrontal standard 44A hold their respective line diametrically opposite down on the sides. During donning, the glasses seem to fit over the head. They have very little feel as worn.

FIG. 9. Counterbalanced cranial suspension device per FIG. 9 differs from device per FIG. 8 partly by having frontal, standards 44 positioned forward so that rear upright countermass trackers 48C on which the massweights 32 track slideably position the cwt.&support lines 34 closer together behind than do the two holders of cwt.&support line slideably 48B of FIG. 8—contrary to what a pictorial comparison of the distance between the countermasses in the two figures would indicate. Harness-fitting member 50 slides on both lines like that same member in FIG. 8 does.

Figures 10, 11, 12, 12A, 13, 14, 15, 16, 17, 18, 19, 20, 21, 22:
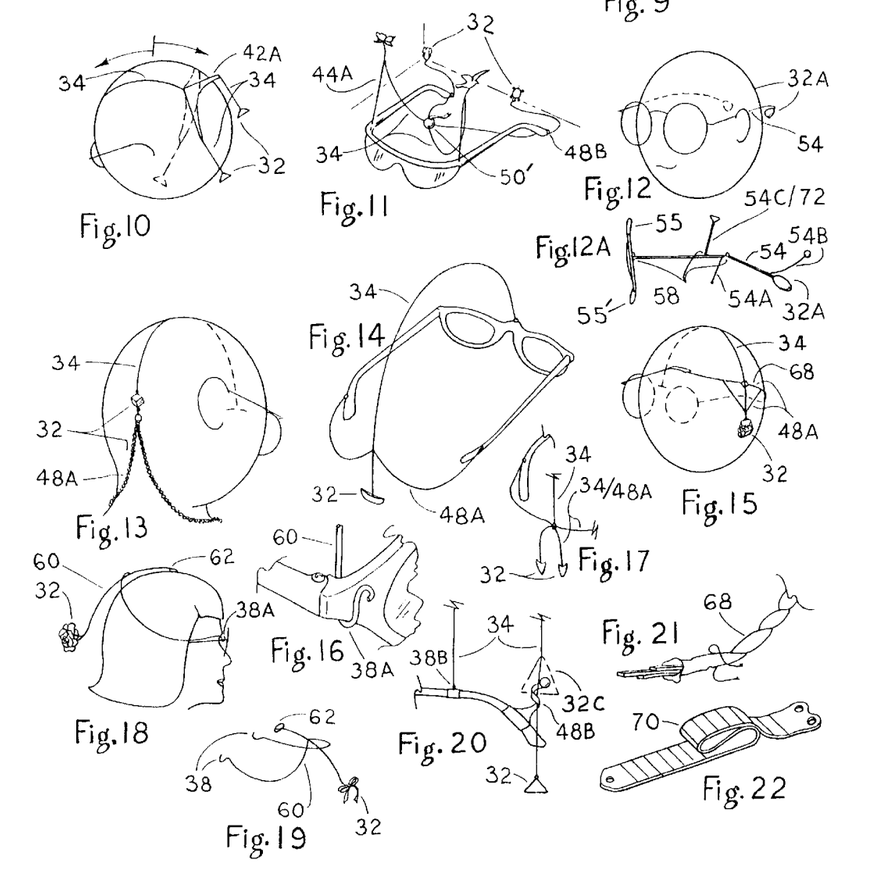
FIG. 10 depicts double-to-single, pendulous, supporting device.
FIG. 11 shows device morphologically and essentially like that of FIG. 8 displayed sitting near a phantomized interior corner.
FIG. 12 shows simplistic, ear-borne bascule device.
FIG. 12A outlines additional device to more closely retain and to keep the balance of ear-centric, bascule device.
FIG. 13 shows support to the glasses bridge from a suitably heavy, chain necklace, through a single-die as an ornamental charm.
FIG. 14 suggests how the pendulous mass might be protected against swinging out of place in back by attachment of loose line, strung between ear-piece extensions.
FIG. 15 the countermass is a miniature of an auto-engine being constricted from swaying too far by a web of tiny tackle.
FIG. 16 details one way that device of FIGS. 18 and 19 might cradle glasses.
FIG. 17 details how retention, in addition to support, is possible by suspending counterweights from earpiece lines that pass slideably through the end of the center working-strand which supports the glasses.
FIG. 18 is a profile view of a lightly framed device from FIG. 19 being used, except that it has a floral massweight instead of a beribboned one.
FIG. 19 is an oblique revelation (looking, depending on momentary mind-flip, either down on the left-rear or up toward the left-front (since the bow in back can be interpreted as either toward or away-from the viewer) of an auxiliary cranial support device that is being used in FIG. 18.
FIG. 20 illustrates quick-thread earpiece device to enable auxiliary support-device similar to that of FIGS. 8 and 11 to be easily detached for re-use later.
FIG. 21 envisions very small bungee cord that when relaxed recoils to perhaps half its working-length.
FIG. 22 shows strap, band or belt that twists only minimally.

FIG. 10 support device is attached to the glasses bridgelink. It widens the conditions that pendant device which is unfastened behind will stay opposite the glasses during extreme head-down work by having an inverted "Y" linkage 42A of pliable sheet material that resists compound bending. The elongated, pliable sheet connects the lines 34 of two countermasses (passenger jet trinkets or charms would be in harmony with the 42A swept-wing shape shown) 32 into a single line 34 allowing ear-down inclinations of the head with weights 32 remaining effective, since when hanging on both sides of the neck, neither of the equal weights can do enough work to raise the other around to its side.

FIG. 11 shows a novelty-item, which might display serious messages, when more flash is better. The two ½ massweights 32 are a turtle and a frog. A bird and butterfly adorn the extremities of two prefrontal standards 44A. Since the attach points on the prefrontal standards are located out of best correspondence to the holders of cwt.&support line slideably, 48B openings, which are located distally on the earpieces, a decorated yoking-element 50' on top, seizes upon lines 34 fixedly; yoking-element 50' is also adjustable in order to make a harness to fit any head.

FIG. 12 pictures a purely bascule-type, ear-supported device that balances solely on the ears. Ear-piece extension-arms 54 hold adjustable counterweights 32A at a weight-times-distance equal to that of the glasses ahead of the ears. With the basic, pendulous device 100, left-right head-wagging "no" is mitigated; with this basic device, nodding "yes" will need to be more deliberate. But steadying-traction to hasten attenuation of glasses bobbles is ill achieved by pressure at the temporal regions—where circulation ought rather to be actively cultivated in order to nourish the area around the eyes where crow's-feet tend to form.

FIG. 12A proposes ear-stops 54A which hook behind the ears when the head leans forward, for rearward retention of glasses; earpiece extra-extension, caudal-retainers 54B, also for rearward keeping, and which along with stabilizing upward-extensions from earpieces 54C, buffer against the powerful kinetic-inertial properties of the glasses during energetic, up-and-down glances; perhaps browpiece 55, and cheekpiece 55' lens-frame extensions which run along the top and bottom of the eyepieces and which do not contact the face when the glasses are still: browpiece extensions 55 to counter rapid head-downward rotation and cheekpiece extensions 55' to see that the lens travel quickly upward with the face without appreciable lag—all enough to redundantly deny any see-sawing from starting. But for most, their earpieces might zigzag from a plainly framed lens-piece, through ear-capturing diversions and on to the counterweight on lever-arm 32A at the base of the head. Alternately counterweights could hug behind the head or pocket in a fold at the top of the neck. The ear-stop diversions 54A should be adjustable to individual anatomy, while the entire unit should be strong enough to resist permanent deformation in use. The upper edges of plain lens-pieces would be adequate at bouncing the glasses to their rest on the ears in the midst of nodding-off, while the ear-stops would keep the glasses during such head-down attitude. At the same time, in spite of the more rearward support-points on the ears, then being in line with the new direction of gravity and so tending to make the glasses front-heavy, sufficient semblance of balance would be preserved if the normal position of counterweight 32A were low enough to make the counterweight arm get effectively longer as it rose.

FIG. 13 features a steadied support and damping resistance, in the form of weightily implemented bodily adornment, a necklace-weight/tensile lateral-restraint for countermass 32/48A fastened around the neck. Either article 32 might be the primary weight, while necklace artifice 32 also confines the supporting means to its place.

FIGS. 14 & 15 show a tethered mass device from FIG. 1, futher restrained with a trifurcated yoke so that the mass is always at its best position in back. In FIG. 14, two tensile lateral-restraint lines 48A hold a cwt.&support line 34 loosely between the earpieces, by fixed attachment, so that the glasses are easily put on and removed yet the countermass is confined to its space. In FIG. 15 a cwt.&support line 34 slides past retaining, elastic line 68 (or through retaining elastic-line /countermass-restraining line 68,48A) which can help keep the glasses backward, while also allowing for pulling them on and off. The cwt.&support line 34 is shown loosely fixed to retaining elastic-line 68 through diagonal restrainment 48A.

A rigid conduit 40 as seen in FIG. 2 for cwt.&support line 34 might be needed to determine the angle of the line in front with device of FIG. 15 as well as that of FIG. 17 in order to keep optical device from pressing rearward onto the face because of pull on the earpieces.

FIG. 16 suggests one method for holding glasses frames in strong, light, hanging-hook linkage 38A than in FIG. 18. Rigid member 60 might hang like chain link from other rigid structure but instead sustain upward force if a lower connection grasped the glasses.

FIG. 17 shows how both glasses-retention as well as support may be achieved through two half-massweights 32 suspended distally on lines from the earpieces. Those lines serve also like cwt&support line restrainment 48A before passing slideably through a medial-type of opening toward the massweight end of a front-segment of cwt.&support line 34 and then as a rear-segment of the cwt.&support line 34 or in other words, serve as cwt.&support line themselves after passing through that medial loop.

FIG. 18 shows a device for floating a floral counterweight 32 behind a head in order to support glasses on a comfort-sized, support fulcrum 62 at a spot on top of that head. Strong, light framework-material 60 forms an auxiliary cranial-support device which would swing omnidirectionally, on the provision 62 which becomes a longitudinally aligned fulcrum instead, when a glasses-holding provision 38A steadies the system to the ears through contact with (or alternately, attachment to) the frames. This device provides vertical repositionability depending on an ability of contact points 38A to get a good grip again after the glasses are shifted to new positions.

FIG. 19. In the 3-D space of FIG. 19 the auxiliary support-hardware of FIG. 18 is shown by itself, suspended on a lot of lead-lines. (The twin possible perspectives of FIG. 18 are as described in Description of Drawings.)

FIG. 20 represents a stacked-spiral or (shown) one-turn-helical earpiece fixture, holder of cwt.&support line slideably 48B to control a pendulous ½ countermass 32 by restraining cwt.&support line 34. Fitted to line-holder 48B is a distal-earpiece counterweight 32C (shown phantom) with a cwt.&support line 34 passing slideably past or through it. Line holder 48B is shown disproportionately large to clearly tell how it is shaped to facilitate installation and removal of the line 34. Both counterweights 32 detach, along with their cwt.&support lines 34, to stow with mates from the other side for later use. Line 34 attachments 38B on each earpiece determine a lateral fulcrum-line which suspends cantilevered support for eyepieces. Cwt.&support lines 34 run either from their respective half-counterweights 32 and across the crown to attach on the opposite earpiece attachment 38B, or interact slideably on top to attachment 38B on the same earpiece, so that cranial support like a FIG. 8 system crossed with device as of FIG. 29 results. For added stability, the distal-earpiece counterweights 32C can be great enough to allow the ears to support Conversely if distal-earpiece counterweights 32C are too slight, it will let weight on the nose. So then in order to get weight back off of the nose, attachments 38B can be repositioned further forward. The two hanging counterweights combined will weigh about the same as the of the rest of the eyewear (only because of helper friction not necessarily exactly when neither the ears nor the nose also support) in order for them to support the rest of the eyewear—including the distal-earpiece counterweights 32C. As ever, nothing on any product should pose a sneak threat to an eye. Projections should be blunted, and by previous convention, placed obviously.

FIG. 21 suggests elastic line 68 which stretches under the weight of the glasses to an abruptly-approached a limit, which is well below the stress-limit of its elastic material, so that it is durable in use.

FIG. 22 features strap, band or belt 70 which typically resists twisting as well as snaking out of a plane, while it bends and wraps easily within that plane.

Figures 23, 24, 25, 26, 27, 28, 29, 30, 31:
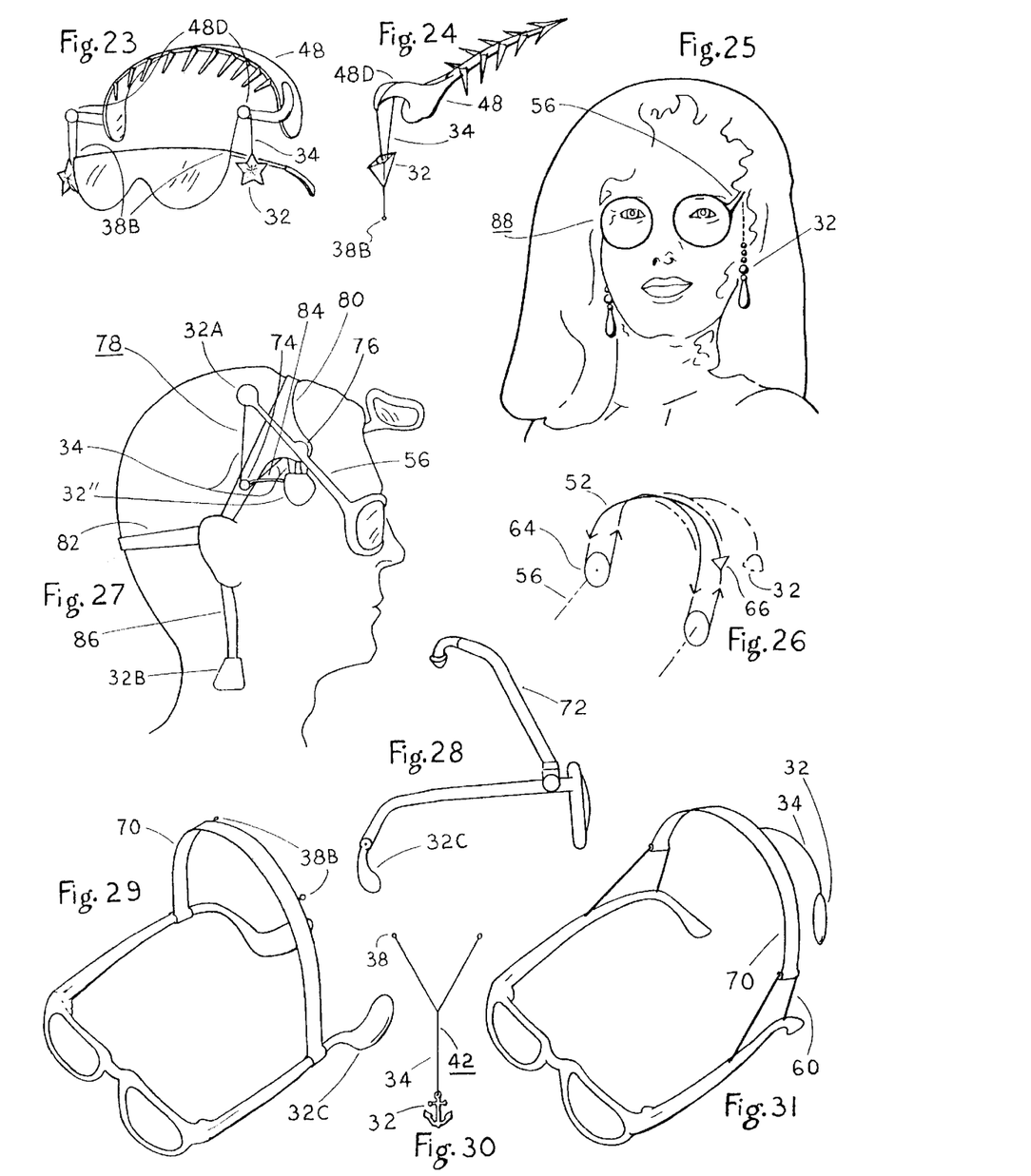
FIGS. 23 and 24 illustrate hair-kept versions of counterbalanced-support devices which hold their mass-weights tantalizingly close to being vertically aligned with supporting points on the glasses.
In FIG. 25 an imaginary model wears counterweighted eyewear without bridge-linkage.
FIG. 26 is a right-front-oblique diagram to help explain device of FIG. 25.
FIG. 27 shows a high-convenience eyepiece-holder in action.
FIG. 28 shows, folded out or expanded, a device of a kind that transforms between regular glasses and glasses capable of supporting themselves without weighing on the nose (and ears).
FIG. 29 shows similar-working glasses (to those of FIG. 28—since all renditions work on the identifying principle of counterbalanced cranial-support) but differently wrought, top-supported, counterbalanced glasses.
FIG. 30 shows a Y-suspended counterweight shaped as a sea anchor.
FIG. 31 shows lens-support device a lot like that of FIG. 29 but resting farther back on the head.

FIGS. 23 & 24 present respectively: hair-band, and hair insert, hair fastening artifices 48 for slideably holding cwt.&support line 34. Two of the (FIG. 24) inserts might be positioned in similar arrangement to the horned projections on the hair-band device of FIG. 23, or a single insert could provide central support, above the nose—perhaps provided in either case, with caudate cranial-countermass behind the head to assure precise placeability. The nearness of the countermass and eyewear to directly under their support points powerfully toward designs for sports use. Such horizontal alignment makes for easily adjusted glasses that are immune to upward motions and downward jolts. In general, such extremely localized support presents totally dynamic-compensated eyewear for non-contact sports. The countermass suspension of FIG. 24 introduces a pure point-source of support, wherein the forces on the countermass are noticed to resolve along a line coincident with the cwt.&support line 34 giving rise to no force-couples to plague the device. In practice the adding of weight presents no difficulty to the head.

The range of positionability as well as the ratio of countermass weight to supported weight is changed by varying the number of stretches of cwt& support line 34 between either those opposing weights and supporting means 48D—as with cwt. 32" of the device in FIG. 27.

FIG. 26 diagrams isometrically, the action and inner workings of fashionable eyewear-sans-bridgelink or glamour-glasses 88 as worn partially hidden under hair in FIG. 25. Left and right temple-pieces 56 insert removably into left and right pulleys 64 . Wear-impervious, highly inelastic connecting-line 52 crisscrosses between connecting-line pulley/temple-piece mounts 64 as shown, so that the eyepieces move in unison. Alternately a pair of gears or similar means could synchro-phase the eyepieces. The four open arrowheads indicate direction of cord travel during downward eyepiece movement. Instead of bangle-bob cwts. 32 of FIG. 25, a springy counterpoising means 66 represented by a closed arrowhead in FIG. 26 can keep the eyepieces from running to the bottom by themselves, under their own weight, but the mechanism would also need to contain sufficient dynamic damping in order that oscillatory tendencies be snubbed. A behind-the-head countermass 32 of FIG. 26 maintains balance overall. The wearer of bridge-less eyewear will with one eyepiece on and one off, be able to glance at her program and still see the stage, or see to apply eye makeup. Removing an eyepiece alterably seizes its pulley. It can also be twisted or rotated on stem 56 from before an eye.

DESCRIPTION OF INVENTION IN FIG. 27

Optical device super-holder 78 has a temple-piece/counterweight-on-lever-arm 56/32A which swivels about pivot 76 which is mounted on a head-seated, weight-bearing device 80. A second eyepiece-counterpoising counterweight 32" is suspended by its cwt.&support line 34 on the end of an arm 84 about a pivot 74. In the figure, the counterweight 32" is pulled upward, toward its stop just below pivot 76 as severally laced lengths of line 34 play from between counterweight 32" and that upper stop. The line then travels wrapping around device at pivot 76 to between that point and counterweight/lever-arm 32A. At the bottom of the super-holder utility 78 where it extends below the ear is a third kind of counterweight, lower cwt. 32B.

OPERATION OF INVENTION IN FIG. 27

Utility 78 is for serious working. The third counterweight, if employed, depending on the length of its extension below the ear, accounts for maybe more than half of the weight of the entire device in order to maintain balance while facing downward. If continuous head-down is anticipated, a strap behind the head at the ears could spare them from prolonged stress. A headband upper weight-bearer 80, as well as such strap 86 could be of leather. Complementary-connected eyepiece-counterweight 32" in tandem with first counterweight 32A counterpoise their eyepiece so that the 32" and 32A weight quantities are inversely interrelated. Either would be maximized if the other were eliminated. In the example pictured, since cwt. 32" moves changing the length of four stretches of line 34 as seen right above cwt. 32", weight 32A moves four times as fast and far. Without weight 32A this unit would sit more compact on the head. Without weight. 32" it would be much simpler. The eyepieces could fold into the ear-slots to transport, and up lie flat. Left and right optical device can be positioned independently so that the two eyes may focus at diverse distances.

FIG. 28 presents transformer-frame, transforming glasses, and introduces their pate-pieces 72, which the pate is pleased to meet anywhere from the vicinity of the hairline to even farther back than the ears. A pair of countermasses 32 as well as the pate-pieces could be detachable. Where the pate-pieces join with the rest of the frames is inconsequential relative to balance. Various embodiments will furnish versatile usefulness through designs that can fold, swivel and telescope to collapse and extend. Countermass 32 is shown hinged so that it can hang forward to help retain the glasses when the head leans far forward. When deployed for use, the pate-piece or pate-pieces can support not only all weight from the face, but the ears too.

Eyewear of FIG. 29 as any device, might also be rendered asunderable into glasses and detached accessory. An over-head strap 70 is attached to earpieces at or near a lateral balance line, which is determined by countermass 32 ear-piece termini. In order to keep a more pliable, lighter strap 70 in place at more frontal locations, a countermass device such as cwt.&support line/pendent assembly 42 of FIG. 30 might be attached at points 38B. The strap might adjust its fit through weighty tugging, akin to that suggested in FIG. 17. It should curve a simple arc across the crown resisting surface strains, to be assuredly positionable.

FIG. 30 is of a Y-yoked cwt&support line assembly 42 which might connect to standards (44, 44A) in front pulling glasses up and holding them on. It might connect to rear standards, leveraging back against the ears. Or it might help make device along the lines of that in FIG. 31, without necessary involvement of the ears. Connect to all device from FIGS. 23 to 31 as practicable.

FIG. 31 has glasses suspended cantilever from a strap 70 stretched over the head between two rigid frames 60 on the earpieces. Cwt.&support line 34 to countermass 32, might comprise stuff that is stiff and in tension. With the strap designed to glide over the hair crosswise or arch above, good positionability is possible. Eyepiece extension-arms might angle past the ears above them.

CONCLUSION, RAMIFICATION AND SCOPE OF INVENTION

Eyewear preferences and needs are as snowflakes. Certifying and celebrating an infinitude of individual differences, eyewear can branch mostly symmetric behind the eyes, to envelope the whole of the head, pleasing and serving users.

Lightly framed device which suggests itself as masculine can also be a light, rigid framework, whereas FIGS. 18 & 19 adroitly draws on only feminine renditions of such device. Fashioned of similar material 60 to the shape of a lowercase "n" with with a stem also on its right side, the legs of the letter would attach to the earpieces and thence run upward to arch across the pate (or anticipating a ladies model, call it the crown) to suspend the front of the glasses by cwts. hung from the pair of upper stems—like counterweighting in FIG. 23 or 24.

Twisted around the earpieces of the inventor's reading glasses is a pair of piano-wire pate-pieces 70 with weighted rearward extensions. Device from FIG. 28 is well blessed among these vying brainchild. A singular, counterweighting strap could provide support. Configuration and counterweighting is transmutable generally, and portable between applications of the method.

Cranial support methods conceptually call for paramount notion of not using the nose to support, so that according to the essence of the devices depicted, and to the thought outlined, the nose should not stick itself into eyewear business so insistently, ever again. When conjuring products according to concept, functionality might dominate, with regard dedicated toward the situation. For instance, the highly articulated head suggests specific sports eyewear. As long as the basic glasses have nosepieces, any cephalic support might be rendered as detachable accessory; the nosepieces might be removable or retractable for when cranial support is used. Rapid, single-handed deployment of expandable convertible features with the device already in place is imaginable and goal-worthy. A base is available on the head for an ultralight instrument with shoulder-elbow-wrist action to position lenses at any point within a volume of radius.

Relief and release dawns from the dutiful necessity to simply endure the dreaded, daily blight of a nose wearied by eyewear, during the first wondrous exposure with a pair of unstressful glasses as it begins to sink in and then register, that punishing an innocent nose is no longer necessary. Stoic, deep-seated resolve and resignation start to crumble as the tiniest of shiny inklings smiles its first of many smiles toward the truly gratifying and delightful realization that there is a new freedom from most of what was bad about glasses—from what was worst about them. From then on, some form of head-support starts to seem a normal, necessary and natural adjunct to eyewear and be taken for granted as just another part of eyewear.

Becoming accustomed to and familiar with new and different device is like getting used to glasses initially— which most have mostly forgotten. A lot is learned during the first try and then much is gained only through experience of longer use. But the payoff of being able to see well, in complete comfort, and continuously so is immediate. It makes a very nice impact, compelling a happy impression on the suddenly and already, formerly glasses-beleaguered.

What I claim is:

1. An apparatus for supporting one or more optical devices on a user's head, comprising:
   (a) an optical holding device for holding said one or more optical devices in fixed relation to a user's eyes; and
   (b) a predetermined amount of countermass; and
   (c) a balancing means which in combination with said optical holding device is for keeping said one or more optical devices in statically balanced equilibrium with the predetermined countermass or for keeping optical device and devices gravitationally counterpoised with that countermass, whereby said one or more optical devices will remain fixed in place in relation to the user's eyes, even when neither touching a user's nose nor face.

2. Device of claim 1 wherein the balancing means comprises a lever-arm.

3. Device of claim 2 further comprising one or more optical devices.

4. Device of claim 1 wherein the balancing means comprises a tension-line.

5. Device of claim 4 further comprising one or more optical devices.

6. Device of claim 1 wherein the balancing means comprises a tension-line and a lever-arm.

7. Device of claim 6 further comprising one or more optical devices.

8. A support apparatus for keeping one or more optical devices before a user's eyes, of the type having a fastening means for securing to the optical device or devices and having a stabilizing means which extends from the fastening means to a user's head, wherein the improvement comprises a countermass of predetermined weight in combination with a balancing means for causing the user's head to support the support apparatus, whereby the support apparatus will support the optical device or devices before the user's eyes without touching a user's face nor nose.

9. Apparatus of claim 8 which comprises no optical device.

* * * * *